United States Patent
Lee et al.

(10) Patent No.: US 12,436,122 B2
(45) Date of Patent: Oct. 7, 2025

(54) APPARATUS AND METHOD FOR MEASURING A LAYER OF A SEMICONDUCTOR DEVICE USING X-RAY DIFFRACTION

(71) Applicant: SAMSUNG ELECTRONICS CO., LTD., Suwon-si (KR)

(72) Inventors: Seungchul Lee, Suwon si (KR); Younghoon Sohn, Suwon si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 59 days.

(21) Appl. No.: 18/460,675

(22) Filed: Sep. 4, 2023

(65) Prior Publication Data

US 2024/0241067 A1 Jul. 18, 2024

(30) Foreign Application Priority Data

Jan. 12, 2023 (KR) .................. 10-2023-0004984

(51) Int. Cl.
*H01L 21/66* (2006.01)
*G01N 23/207* (2018.01)
*G01N 23/223* (2006.01)

(52) U.S. Cl.
CPC ......... *G01N 23/223* (2013.01); *G01N 23/207* (2013.01); *H01L 22/12* (2013.01); *G01N 2223/6116* (2013.01)

(58) Field of Classification Search
CPC .............. G01N 23/223; G01N 23/207; G01N 2223/6116; H01L 22/12
See application file for complete search history.

(56) References Cited

U.S. PATENT DOCUMENTS

| | | | |
|---|---|---|---|
| 5,003,569 A | 3/1991 | Okada et al. | |
| 7,110,491 B2 | 9/2006 | Mazor et al. | |
| 11,397,154 B2 | 7/2022 | He | |
| 2012/0181697 A1* | 7/2012 | Lavoie | H01L 21/768 257/769 |
| 2017/0158571 A1* | 6/2017 | Kijima | C04B 35/62218 |
| 2019/0094160 A1* | 3/2019 | Sunder | G01N 23/20016 |
| 2021/0262951 A1 | 8/2021 | Wakisaka et al. | |
| 2023/0010061 A1* | 1/2023 | Baek | H10N 30/706 |
| 2024/0102950 A1* | 3/2024 | Liu | G01N 23/201 |

FOREIGN PATENT DOCUMENTS

| | | |
|---|---|---|
| JP | 3889851 | 3/2007 |
| KR | 10-2008-0048925 | 6/2008 |
| KR | 10-1040555 | 6/2011 |
| KR | 10-1494359 | 2/2015 |

OTHER PUBLICATIONS

Birkholz "Thin films and multilayers", International Tables for Crystallography (2019). vol. H, Chapter 5.4, p. 581-600 (Year: 2019).*

* cited by examiner

*Primary Examiner* — David P Porta
*Assistant Examiner* — Mamadou Faye
(74) *Attorney, Agent, or Firm* — Morgan, Lewis & Bockius LLP

(57) ABSTRACT

An apparatus for measuring a thickness of a metal layer includes a light source unit configured to generate X-rays, a detection unit configured to detect the X-rays diffracted from a specimen, and a processor configured to measure the thickness of the metal layer of the specimen using an intensity of the X-rays diffracted from the specimen.

15 Claims, 5 Drawing Sheets

SP1

W

APPARATUS AND METHOD FOR MEASURING A LAYER OF A SEMICONDUCTOR DEVICE USING X-RAY DIFFRACTION

CROSS-REFERENCE TO RELATED APPLICATION

This application is based on and claims priority under 35 U.S.C. § 119 to Korean Patent Application No. 10-2023-0004984, filed on Jan. 12, 2023, in the Korean Intellectual Property Office, the disclosure of which is incorporated by reference herein in its entirety.

TECHNICAL FIELD

The inventive concept relates to an apparatus for measuring a semiconductor device and a method of measuring a semiconductor device, and more particularly to an apparatus and method for measuring a layer of a semiconductor device using X-ray diffraction.

DESCRIPTION OF RELATED ART

Semiconductor devices such as logic and memory devices may be manufactured through a series of processes. In addition, measurements of semiconductor devices may be made during a process. The measurements may be used to detect defects on wafers, whereby higher yields may be realized.

In some methods of measuring semiconductor devices, traditional imaging technologies such as a Transmission Electron Microscope (TEM) and a Scanning Electron Emission Microscope (SEM) may be utilized with destructive specimen preparation techniques. For example, the TEM may capture high resolution images at any depth in a specimen, but may require destructive cutting of the specimen and may require a long process time. Accordingly, research has been conducted in the field of semiconductor device inspection using X-rays.

Inspection of semiconductor devices using X-rays may include X-ray Diffraction (XRD) and X-ray fluorescence (XRF). The XRD method may analyze the crystal structure of a specimen by measuring the intensity of the X-ray diffracted from the specimen. In addition, the XRD method has a characteristic in which the intensity of the X-ray increases at a specific incident angle and diffraction angle according to the crystal structure and directionality of the specimen. In addition, the XRF method may detect fluorescence energy generated from the energy movement of electrons inside the specimen and measure a type and an amount of material that make up the specimen.

SUMMARY

The inventive concept provides an apparatus and method for measuring a semiconductor device using X-ray diffraction, which may include measuring a thickness of a metal layer.

In addition, applications of the technical idea of the inventive concept are not limited to the applications described herein, and other applications may be clearly understood by a person skilled in the art from the following description.

According to an aspect of the inventive concept, there is provided an apparatus for measuring a thickness of a metal layer, the apparatus including a light source unit configured to generate X-rays, a detection unit configured to detect the X-rays diffracted from a specimen, and a processor configured to measure the thickness of the metal layer of the specimen using an intensity of the X-rays diffracted from the specimen.

According to another aspect of the inventive concept, there is provided a method including preparing a semiconductor device, detecting a first intensity of first X-rays diffracted by the semiconductor device, depositing a metal layer on the semiconductor device, detecting a second intensity of second X-rays diffracted by the semiconductor device on which the metal layer has been deposited, and measuring a thickness of the metal layer by comparing the first intensity with the second intensity.

According to another aspect of the inventive concept, there is provided a method including preparing a semiconductor device; detecting a first intensity of first X-rays diffracted by the semiconductor device, depositing a metal layer on the semiconductor device, detecting a second intensity of second X-rays diffracted by the semiconductor device on which the metal layer has been deposited, and measuring a thickness of the metal layer by comparing the first intensity with the second intensity, wherein a detection unit is disposed at a position having a first angle relative to a direction of the first X-rays generated by a light source unit, an angle formed between the first X-rays generated by the light source unit and the semiconductor device is a second angle, and the first angle and the second angle are unchanged between the detecting of the first intensity and the detecting of the second intensity.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
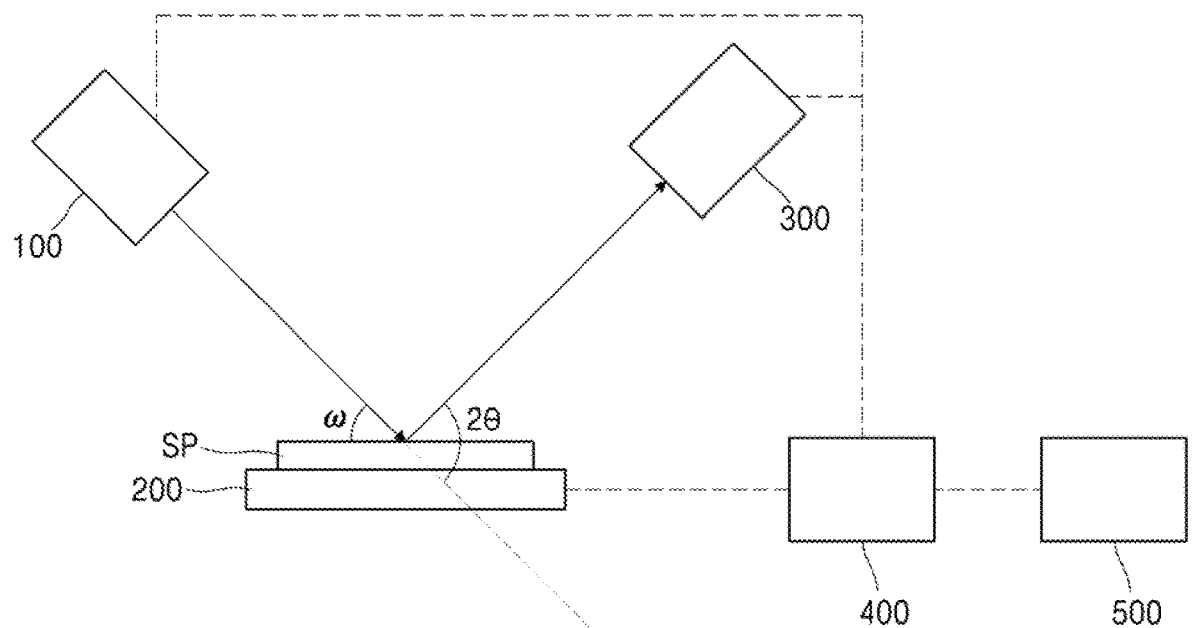
FIG. 1 is a schematic diagram illustrating an apparatus for measuring a semiconductor device, according to an embodiment.

Hereinafter, embodiments of the inventive concept will be described in detail with reference to the accompanying drawings. The same reference numerals are used for the same elements in the drawings, and redundant descriptions thereof may be omitted.

FIG. 1 is a schematic diagram illustrating an apparatus for measuring a semiconductor device, according to an embodiment.

Figure 3:
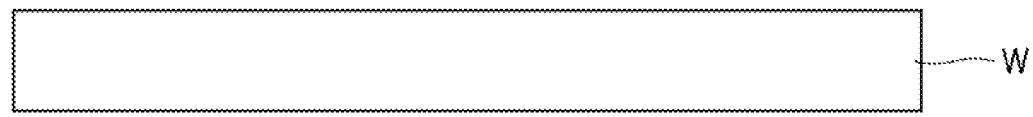
FIG. 3 is a cross-sectional view illustrating a target to be inspected through an apparatus for measuring a semiconductor device, according to an embodiment.
Figure 3:
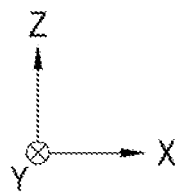
Figure 4:
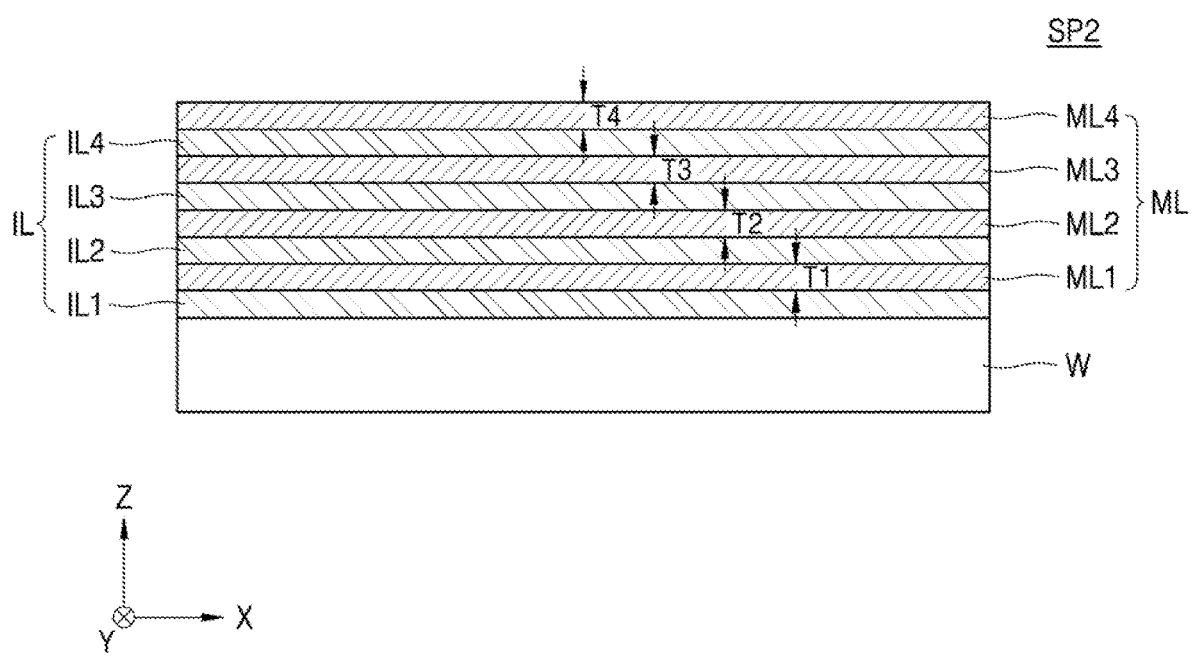
FIG. 4 is a cross-sectional view illustrating a target to be inspected through an apparatus for measuring a semiconductor device, according to an embodiment.

Referring to FIG. 1, an apparatus 10 for measuring a semiconductor device may be configured to inspect an inspection target such as a wafer W (of FIG. 3 or FIG. 4). According to embodiments, the apparatus 10 for measuring a semiconductor device may non-destructively inspect an inspection target such as the wafer W (of FIG. 3 or 4). The apparatus 10 for measuring a semiconductor device may perform a semiconductor device inspection using X-ray diffraction (XRD).

The semiconductor device may include, for example, Spin Transfer Torque Random Access Memory (STT-RAM), Vertical NAND (VNAND) memory, Dynamic Random Access Memory (DRAM), Three Dimensional Flash (3D-FLASH) memory, Resistive Random Access Memory (Re-RAM), or Phase Change Random Access Memory (PC-RAM). For example, the semiconductor device measured by the apparatus 10 for measuring a semiconductor device according to an embodiment may be DRAM or VNAND memory.

The apparatus 10 for measuring a semiconductor device may include a light source unit 100, a stage 200, a detection unit 300, a control unit 400, and a processor 500.

The light source unit 100 may generate X-rays and irradiate a specimen SP with the generated X-rays. For example, the light source unit 100 may include any one of a particle accelerator source, a liquid anode source, a rotating anode source, a stationary solid anode source, a microfocus source, a microfocus rotating anode source, or an inverse Compton source. I light source unit 100, which is an X-ray source, is not limited to the sources described herein. For example, the light source unit 100 may further include a monochromator capable of adjusting a wavelength of a generated light.

The light source unit 100 may further include a first actuator (not shown). The first actuator may move and/or rotate the light source unit 100. The first actuator may be operated by the control unit 400. The light source unit 100 may be moved and/or rotated based on the specimen SP. The relative positions between the light source unit 100 and the specimen SP may be changed by the first actuator.

The specimen SP may be disposed on the stage 200. The stage 200 may further include a second actuator (not shown) that rotates the stage 200. The second actuator may be operated by the control unit 400. The first actuator and/or the second actuator may be used to rotate the stage 200 around the X-axis, Y-axis, and/or Z-axis.

The detection unit 300 may detect the X-rays diffracted from the specimen SP. The detection unit 300 may detect the X-rays diffracted from the specimen SP, which were generated by the light source unit 100. The detection unit 300 may measure the intensity of the X-rays diffracted from the specimen SP. For example, the detection unit 300 may convert the intensity of the X-rays diffracted from the specimen SP into an electrical signal.

The specimen SP may include a wafer W, as shown in FIG. 3. In addition, the specimen SP may further include a wafer W and a metal layer ML on the wafer W, as shown in FIG. 4. For example, the metal layer ML may include at least one of tungsten (W), aluminum (Al), copper (Cu), nickel (Ni), cobalt (Co), molybdenum (Mo), titanium (Ti), or tantalum (Ta). The metal layer ML may be a layer deposited on the wafer W.

The wafer W may be, for example, a semiconductor substrate. The wafer W may be, for example, a single crystal substrate. These substrates may include, for example, silicon (Si), strained Si, silicon alloy, silicon carbide (SiC), silicon germanium (SiGe), silicon germanium carbide (SiGeC), germanium, germanium alloy, gallium arsenide (GaAs), indium arsenide (InAs), Groups III-V semiconductors, Groups II-VI semiconductors, combinations thereof, or laminates thereof. The wafer W may be disposed on the stage 200. For example, the wafer W may be supported by the stage 200 and fixed to the stage 200, such that a movement of the stage 200 is imparted to the wafer W.

Since a single crystal material has a regular arrangement, when a wafer W contains a single crystal material, the detection unit 300 may obtain information about the wafer W from an electron diffraction pattern of the wafer W. The intensity of the diffracted X-rays detected by the detection unit 300 may vary according to, for example, Bragg's law. In addition, the intensity of the X-rays diffracted inside the wafer W may be vary with an arrangement of the metal layer ML on the wafer W. According to an embodiment, the detection unit 300 may measure the intensity of the X-rays diffracted from the wafer W at positions where the metal layer ML is not placed and the intensity of the X-rays diffracted from the wafer W at positions where the metal layer ML is placed.

According to an embodiment, the apparatus 10 for measuring a semiconductor device may measure the thickness of the metal layer ML arranged on an oxide site (OS) of the wafer W. The OS of the wafer W may refer to a space separately provided to measure the thickness of the metal layer ML. The OS of the wafer W may be used to measure the thickness of the metal layer ML rather than a cell region.

The detection unit 300 may further include a third actuator (not shown) that moves and/or rotates the detection unit 300. The third actuator may be operated by the control unit 400. The third actuator may be operated by the control unit 400 so that the detection unit 300 may move and/or rotate with respect to the specimen SP. Relative positions between the detection unit 300 and the specimen SP may be varied by the third actuator.

The control unit 400 may control an operation of one or more of the light source unit 100, the stage 200, or the detection unit 300. For example, the control unit 400 may rotate each of the light source unit 100, the stage 200, and/or the detection unit 300 to adjust the relative position of each of the light source unit 100, the stage 200, and/or the detection unit 300.

For example, the control unit 400 may place the detection unit 300 at a position where the detection unit 300 rotates by a first angle $2\theta$ relative to a direction of the X-rays emitted by the light source unit 100. That is, when the control unit 400 moves the light source unit 100, the detection unit 300 may also move accordingly. In addition, the control unit 400 may rotate the light source unit 100, which may change the angle formed by the X-rays of the light source unit 100 and the specimen SP. The angle formed by the X-rays of the light source unit 100 and the specimen SP may be referred to as the second angle $\omega$. For example, the first angle $2\theta$ may be about 70°. In another embodiment, the first angle $2\theta$ may vary by changing the second angle $\omega$. The first angle $2\theta$ may vary depending on the material forming the metal layer ML.

The processor 500 may be configured to process the electrical signal obtained by the detection unit 300. For example, the processor 500 may be configured to preprocess measurement data composed of electrical signals acquired by the detection unit 300, convert the pre-processed data, and perform operations between portions of filtered data of a target to be inspected, e.g., the specimen SP.

The processor 500 may obtain a second angle $\omega$. The second angle $\omega$ may correspond to a position of the light source unit 100 where the intensity of the X-rays detected by the detection unit 300 is the highest. The process by which the processor 500 obtains the second angle $\omega$ may include moving and/or rotating the light source unit 100 and the detection unit 300, with the first angle $2\theta$ fixed to a specific value. That is, the second angle $\omega$ may be determined in a state in which the first angle 2θ is fixed. For example, the detection unit 300 may be configured to measure the intensity of the X-rays diffracted from the specimen SP when the light source unit 100 and the detection unit 300 are disposed at different positions around the specimen SP and a relative position of the light source unit 100 and the detection unit 300 is fixed. That is, the relative position of the light source unit 100 and the detection unit 300 may be the same for each of the different positions around the specimen SP. The process of obtaining the second angle ω may be referred to as an omega (ω) scan. Here, the intensity of the X-ray detected by the detection unit 300 may mean the intensity of the X-rays diffracted from the wafer W when the metal layer ML is not disposed on the wafer W.

For example, the control unit 400 may rotate the light source unit 100 and the detection unit 300 around the specimen SP while fixing the relative positions of the light source unit 100 and the detection unit 300. For example, the control unit 400 may rotate each of the light source unit 100 and the detection unit 300 around the specimen SP while fixing the light source unit 100 and the detection unit 300 to form the first angle 2θ.

For example, the processor 500 may compare the intensity of the X-rays diffracted by the wafer W on which the metal layer ML is not disposed with the intensity of the X-rays diffracted by the wafer W on which the metal layer ML is disposed. When the detection unit 300 measures the intensity of the diffracted X-rays, the control unit 400 may control the relative positions of the light source unit 100, the stage 200, and/or the detection unit 300 so that an angle between the light source unit 100 and the stage 200 and an angle between the light source unit 100 and the detection unit 300 form the same first angle 2θ and the second angle ω, respectively. That is, the first angle 2θ and the second angle ω may be unchanged between the detecting of the intensity of the X-rays diffracted by the wafer W on which the metal layer ML is not disposed and detecting the intensity of the X-rays diffracted by the wafer W on which the metal layer ML is disposed. Similarly, the first angle 2θ and the second angle ω may be unchanged between any subsequent measurements of the intensity of the X-rays diffracted by the wafer W.

Although not shown in FIG. 1, the intensity of the diffracted X-rays may be measured by the detection unit 300 using a goniometer (not shown). For example, the goniometer may be a component of the detection unit 300. The first angle 2θ and the second angle ω may be determined using the goniometer.

The intensity of the X-rays diffracted from the wafer W may be reduced by the metal layer ML formed on the wafer W. For example, when the metal layer ML is relatively thick, the intensity of the X-rays detected by the detection unit 300 may be relatively low, and when the metal layer ML is relatively thin, the intensity of the X-rays detected by the detection unit 300 may be relatively high.

Using these properties, the thickness of the metal layer ML may be measured, for example, by the Beer-Lambert law. The relationship between the thickness of the metal layer ML and the intensity of the diffracted X-rays may be represented by Equation 1.

$$\frac{I_2}{I_1} = \exp(-\mu t) \quad \text{[Equation 1]}$$

Here, $I_1$ refers to a first intensity of the X-rays, and the first intensity $I_1$ refers to the intensity of the X-ray detected by the detection unit 300 when the metal layer ML is not disposed on the wafer W. $I_2$ refers to a second intensity of the X-rays, and the second intensity $I_2$ refers to the intensity of the X-ray detected by the detection unit 300 when the metal layer ML is disposed on the wafer W. μ may be a coefficient that varies depending on the metal forming the metal layer ML, and t may be the thickness of the metal layer ML.

Here, the first intensity $I_1$ may be a maximum value of the intensity of the diffracted X-ray detected by the detection unit 300 when the metal layer ML is not formed on the wafer W. In addition, the second intensity $I_2$ may be a maximum value of the intensity of the diffracted X-rays detected by the detection unit 300 when the metal layer ML is formed on the wafer W.

In another embodiment, the first intensity $I_1$ may refer to an integral area on a graph of the intensity of the X-rays detected by the detection unit 300 when the metal layer ML is not formed on the wafer W. In addition, the second intensity $I_2$ may refer to an integral area on a graph of the intensity of the X-rays detected by the detection unit 300 when the metal layer ML is formed on the wafer W.

That is, the thickness of the metal layer ML may be represented by Equation 2.

$$t = \frac{-\left(\ln\left(\frac{I_2}{I_1}\right)\right)}{\mu}$$

That is, the processor 500 may measure the thickness of the metal layer ML by comparing the intensity of the X-rays diffracted from the wafer W where the metal layer ML is not placed with the intensity of the X-rays diffracted from the wafer W where the metal layer ML is placed. For example, the thickness of the metal layer ML may be greater than about 10 micrometers. The processor 500 may measure the volume of the metal layer ML by using the thickness of the metal layer ML.

In the case of an X-ray fluorescence (XRF) method, the thickness of the metal layer ML may not be measured in a case where the thickness of the metal layer ML is about 10 micrometers or more.

According to embodiments, the control unit 400 and the processor 500 may be implemented in hardware, firmware, software, or any combination thereof. For example, the control unit 400 and the processor 500 may include computing devices such as a workstation computer, a desktop computer, a laptop computer, or a tablet computer. The control unit 400 and the processor 500 may include a simple controller or a complicated processor, such as a microprocessor, a central processing unit (CPU), or a graphics processing unit (GPU), and a processor may be configured by software, dedicated hardware, or firmware. The control unit 400 and the processor 500 may be implemented by, for example, a general-purpose computer or application-specific hardware such as a Digital Signal Processor (DSP), a Field Programmable Gate Array (FPGA), or an Application Specific Integrated Circuit (ASIC).

According to some embodiments, the operations of the control unit 400 and the processor 500 may be implemented as instructions stored on a machine-readable medium that may be read and executed by one or more processors. Here, the machine-readable medium may include any mechanism for storing and/or transmitting information in a form readable by a machine (e.g., a computing device). For example, the machine-readable media may include read only memory (ROM), random access memory (RAM), magnetic disk storage media, optical storage media, and/or flash memory devices.

Firmware, software, routines, and instructions may also be configured to perform the operations described for the control unit 400 and/or the processor 500, or any process described herein. The description of the control unit 400 and the processor 500 is provided for convenience of explanation, and the operation of the control unit 400 and the processor 500 described herein may be caused by other devices that execute computing devices, processors, firmware, software, routines, and commands.

A conventional semiconductor device measurement apparatus may measure the thickness of a metal layer formed on a wafer using an XRF analysis method. However, with increasingly high performance electronic products, a degree of integration of semiconductor devices has increased, and the thickness of the metal layer formed on the wafer has continued to increase. When thickness of the metal layer increases, the X-ray spectroscopic signal gradually decreases, and the measurement sensitivity and measurement reliability of the XRF analysis method may be reduced.

According to an embodiment, the apparatus 10 for measuring a semiconductor device may measure the thickness of the metal layer ML formed on the wafer W using an X-ray diffraction (XRD) method. In the case of X-rays diffraction light, a decrease in signal strength may be relatively small compared to the XRF analysis method, even in the case of thick metal layers ML. Therefore, even when the thickness of the metal layer ML increases, the apparatus 10 for measuring a semiconductor device of the inventive concept may have relatively high measurement sensitivity and measurement reliability to the thickness of the metal layer ML. For example, as a thickness of the metal layer ML increases, the apparatus 10 for measuring a semiconductor device of the inventive concept may have relatively high measurement sensitivity and measurement reliability as compared to the XRF analysis method.

Figure 2:
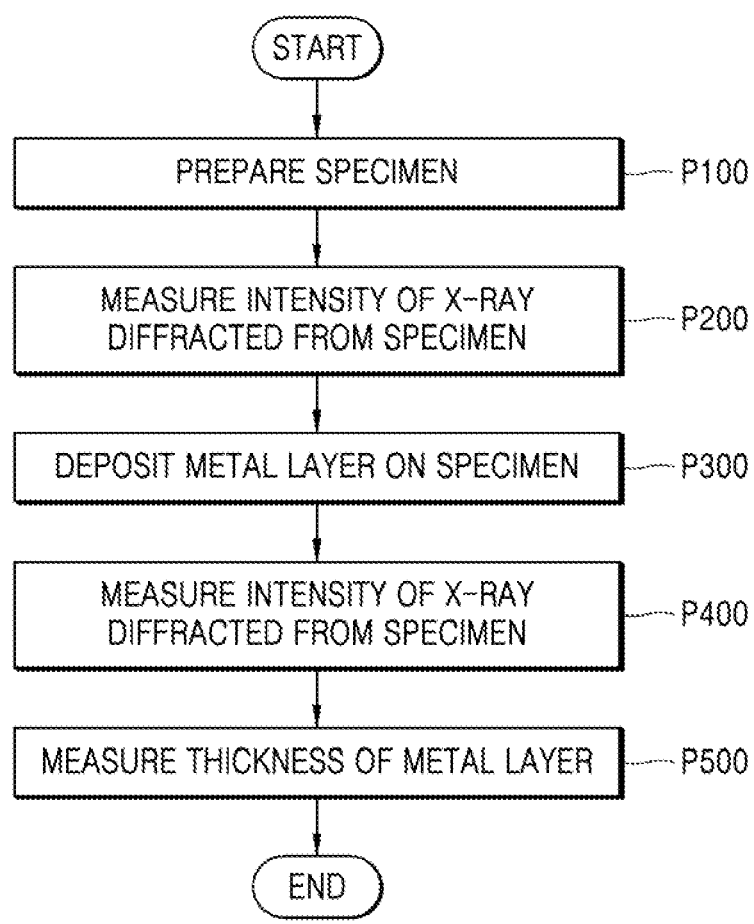
FIG. 2 is a flowchart schematically illustrating a method of measuring a semiconductor device, according to an embodiment.

FIG. 2 is a flowchart schematically illustrating a method of measuring a semiconductor device, according to an embodiment.

Referring to FIG. 1 and FIG. 2, first, a specimen SP is prepared (P100). For example, a wafer W, to which a metal layer ML is to be formed later, is prepared. The wafer W on which the metal layer ML is not formed may be disposed on the stage 200. For example, in operation P100, a semiconductor device may be prepared.

Thereafter, the detection unit 300 may measure the intensity of the X-ray diffracted from the specimen SP (P200). That is, the detection unit 300 may measure the intensity of the X-ray diffracted from the wafer W. The control unit 400 may rotate one or more of the light source unit 100, the stage 200, or the detection unit 300 to adjust the relative positions of the light source unit 100, the stage 200, and/or the detection unit 300.

For example, the control unit 400 may place the detection unit 300 at a position where the detection unit 300 is rotated by a first angle 2θ relative to a direction of the X-ray emitted by the light source unit 100. That is, when the control unit 400 rotates the light source unit 100, the detection unit 300 may rotate accordingly. In addition, the control unit 400 may rotate the light source unit 100, and the angle formed by the X-ray of the light source unit 100 and the specimen SP may be referred to as the second angle ω. For example, the first angle 2θ may be about 70°. In another embodiment, the first angle 2θ may vary by changing the second angle ω.

For example, the control unit 400 may rotate the light source unit 100 and the detection unit 300 around the specimen SP while fixing the relative positions of the light source unit 100 and the detection unit 300. In an example where the relative positions of the light source unit 100 and the detection unit 300 are fixed, when the light source unit 100 rotates, the detection unit 300 may also rotate.

The processor 500 may obtain a second angle ω by performing an omega ω scan. The omega ω scan may include rotating the light source unit 100 and the detection unit 300 and recording a position of the light source unit 100 when the intensity of the X-ray detected by the detection unit 300 is the highest. In another embodiment, the omega ω scan may include rotating the stage 200 and recording a position of the stage 200 when the intensity of the X-ray detected by the detection unit 300 is the highest.

An intensity of the X-ray diffracted from the wafer W at the second angle ω, as determined by completing the omega ω scan, may be referred to as the first intensity $I_1$. Here, the first intensity $I_1$ may be a maximum value of the intensity of the diffracted X-ray detected by the detection unit 300. In another embodiment, the first intensity $I_1$ may refer to an integral area on a graph of the intensity of the diffracted X-ray detected by the detection unit 300.

A deposition process of the metal layer ML may be performed on the specimen SP (P300). That is, the deposition process of the metal layer ML may be performed on the specimen SP (P300) following the determination of the first intensity $I_1$. For example, a deposition process of a metal layer ML may be performed on the wafer W. For example, the metal layer ML may be deposited on the oxide site (OS) of the wafer W. For example, the metal layer ML may include W, Al, Cu, Ni, Co, Mo, Ti, Ta, and/or a combination thereof.

The intensity of the X-ray diffracted from the specimen SP may be measured (P400). That is, the intensity of the X-ray diffracted from the specimen SP may be measured (P400) may be measured following the deposition of the metal layer ML. For example, the specimen SP of operation P400 may further include the metal layer ML, unlike the specimen SP of operation P200. As another example, the specimen SP of operation P400 may include more metal layers ML, which may not have been included in the specimen SP of operation P200. The X-rays diffracted from the wafer W may pass through the metal layer ML and be measured as a second intensity $I_2$ that is less than the first intensity $I_1$. In a case where two or more metal layers ML were deposited on the specimen SP at operation P300, the X-rays diffracted from the wafer W may pass through the metal layers ML and be measured as the second intensity $I_2$ that is less than the first intensity $I_1$.

Here, the second intensity $I_2$ may be a maximum value of the intensity of the diffracted X-ray detected by the detection unit 300. In another embodiment, the second intensity $I_2$ may refer to an integral area on a graph of the intensity of the diffracted X-ray detected by the detection unit 300.

When measuring the second intensity $I_2$, the control unit 400 may control the respective relative positions of the light source unit 100, the stage 200, and/or the detection unit 300 using the first angle 2θ and the second angle ω of operation P200.

The thickness of the metal layer(s) ML formed on the wafer W may be measured (P500). The processor 500 may measure the thickness of the metal layer ML using, for example, the Beer-Lambert law. The processor 500 may measure the thickness of the metal layer ML using Equation 1 and/or Equation 2. In addition, the processor 500 may measure the volume of the metal layer ML by using the thickness of the metal layer ML. For example, the thickness of the metal layer ML may be about 10 micrometers or more.

The apparatus for measuring a semiconductor device according to some embodiments may inspect the semiconductor device without destroying the semiconductor device using an X-ray diffraction method. In addition, the first angle 2θ and the second angle ω of operation P200 may be used in operation P400, so the second intensity $I_2$ may be measured. That is, the second intensity $I_2$ may be measured in operation P400 without re-determining the first angle 2θ and the second angle ω by performing the operation P200 a further time.

Although FIG. 1 and FIG. 2 have been used to describe an example in which the first intensity $I_1$ is measured based on the wafer W on which the metal layer ML is not formed, and the second intensity $I_2$ is measured based on the specimen SP having the metal layer ML formed thereon, the technical spirit of the inventive concept is not limited thereto. For example, the first intensity $I_1$ may be measured based on the specimen SP in which the metal layer ML is formed, and the second intensity $I_2$ may be measured based on the wafer W in which the metal layer ML is not formed. In another embodiment, the first intensity $I_1$ and the second intensity $I_2$ may be measured based on the specimen SP on which the metal layer ML is formed. In still another embodiment, the first intensity $I_1$ may be measured based on the specimen SP in which the metal layer ML is formed, and the second intensity $I_2$ may be measured based on the wafer W in which a further metal layer ML is formed.

FIG. 3 and FIG. 4 are cross-sectional views respectively illustrating a target to be inspected through an apparatus for measuring a semiconductor device, according to embodiments. A description will be made with reference to FIG. 3 and FIG. 4 together with FIG. 1 and FIG. 2.

Referring to FIG. 3 and FIG. 4, the specimen SP may include a wafer W. The specimen SP that does not include the metal layer ML may be referred to as a first specimen SP1, and the specimen SP that includes the metal layer ML may be referred to as a second specimen SP2.

Although FIG. 3 illustrates that the first specimen SP1 includes only the wafer W, for example, the first specimen SP1 may include a plurality of insulating layers IL on the wafer W.

The intensity of the X-ray diffracted from the first specimen SP1 of FIG. 3 may be referred to as the first intensity $I_1$, and the intensity of the X-ray diffracted from the second specimen SP2 of FIG. 4 may be referred to as the second intensity $I_2$. The second intensity $I_2$ may be less than the first intensity $I_1$.

For example, the apparatus 10 and method for measuring a semiconductor device according to an embodiment may measure features of DRAM or VNAND memory.

A plurality of insulating layers IL and a plurality of metal layers ML may be stacked on the wafer W. Although not illustrated, after the plurality of insulating layers IL and a plurality of sacrificial layers (not illustrated) may be stacked on the wafer W in the vertical direction (Z direction), a word line cut (not illustrated) penetrating the plurality of insulating layers IL and the plurality of sacrificial layers may be formed and the plurality of sacrificial layers may be replaced with the plurality of metal layers ML through the word line cut. For example, the plurality of metal layers ML may be word lines.

In the present specification, a horizontal direction (X direction and/or Y direction) may refer to a direction parallel to a circumferential surface of the wafer W, and the vertical direction (Z direction) may refer to a direction perpendicular to the horizontal direction (X direction and/or Y direction).

FIG. 4 illustrates that first insulating layer IL1, second insulating layer IL2, third insulating layer IL4, and fourth insulating layer IL4 and first metal layer ML1, second metal layer ML2, third metal layer ML3, and fourth metal layer and ML4, which may be sequentially and alternately stacked on the wafer W. The technical idea of this inventive concept is not limited thereto. For example, three or more metal layers ML may be placed on the wafer W, or five or more metal layers ML may be placed on the wafer W.

The first metal layer ML1 may have a first thickness T1. The second metal layer ML2 may have a second thickness T2. The third metal layer ML3 may have a third thickness T3. The fourth metal layer ML4 may a fourth thickness T4. The first to fourth thicknesses T1, T2, T3, and T4 may be measured in the vertical direction (Z direction). The sum of the first to fourth thicknesses T1, T2, T3, and T4 may be a total thickness of the metal layer ML.

The insulating layer IL may not include metal, and the metal layer ML may include metal. For example, the insulating layer IL may include, for example, titanium nitride, tantalum nitride, silicon oxide, silicon nitride, SiON, SiOCN, SiCN, and/or a combination thereof. For example, the metal layer ML may include W, Al, Cu, Ni, Co, Mo, Ti, Ta, and/or a combination thereof.

The apparatus 10 and method for measuring a semiconductor device according to some embodiments may measure the total thickness of the metal layer ML. That is, the apparatus 10 and method for measuring a semiconductor device according to some embodiments may measure the sum of the first to fourth thicknesses T1, T2, T3, and T4. Accordingly, the apparatus 10 and method for measuring a semiconductor device may determine a degree of progress of a process of depositing the first to fourth metal layers ML1, ML2, ML3, and ML4 of the metal layer ML. For example, a thickness of each metal layer may be individually measured after it has been deposited and before a next layer is deposited.

Figure 5:
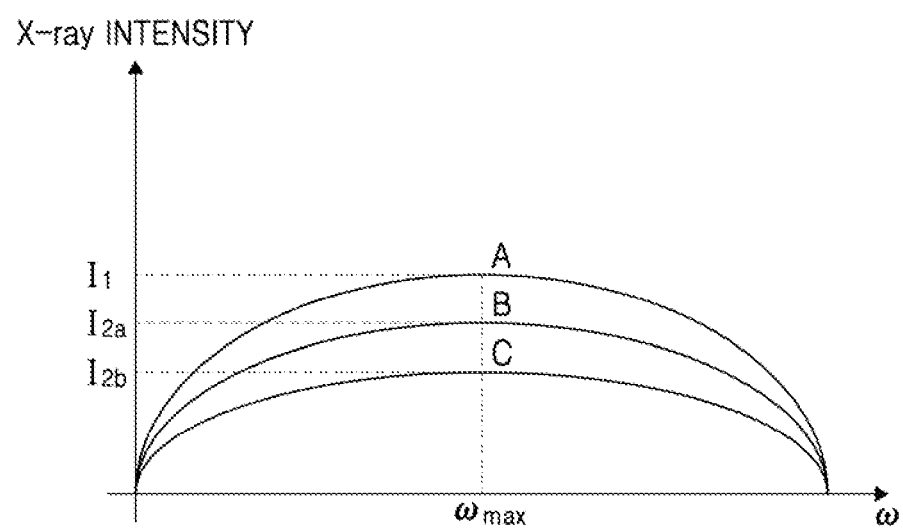
FIG. 5 is a graph showing the intensity of an X-ray measured by a method of measuring a semiconductor device, according to an embodiment.

FIG. 5 is a graph showing the intensity of an X-rays measured by a method of measuring a semiconductor device according to an embodiment. For convenience of description, the redundant description previously given with reference to FIG. 1 to FIG. 4 may be omitted. In the graph, the horizontal axis represents the second angle ω, and the vertical axis represents the intensity of the detected X-ray.

Referring to FIG. 5, a maximum detected value of the intensity of the X-ray diffracted from the wafer W that does not include the metal layer ML may have a first intensity $I_1$. In addition, a maximum detected value of the intensity of the X-ray diffracted from the wafer W including the metal layer ML may be one of the second intensities I2a or I2b that is lower than the first intensity $I_1$. That is, the second intensities I2a or I2b may correspond to respective second specimens SP2.

When the intensity of the X-ray diffracted from the first specimen SP1 has the first intensity $I_1$, the second angle ω may be referred to as $\omega_{max}$. When the second angle ω is $\omega_{max}$, the intensity of the diffracted X-ray from the second specimen SP2 may be assumed to be a maximum. Therefore, the apparatus 10 and method for measuring a semiconductor device may measure the thickness of the metal layer ML by comparing the intensity of the diffracted X-rays from the first specimen SP1 and the second specimen SP2 while fixing the second angle ω to $ω_{max}$.

For example, curve A may correspond to the first specimen SP1 that does not include a metal layer ML, curve B may correspond to the second specimen SP2 that includes a metal layer ML having a first thickness, and curve C may be correspond to another second specimen SP2 that includes a metal layer ML having a second thickness. The thickness of the metal layer ML corresponding to curve B may be less than the thickness of the metal layer ML corresponding to curve C. The metal layer ML of curve B and the metal layer ML of curve C include a same material.

When the second angle ω is $ω_{max}$, the lower the intensity of the diffracted X-ray a specimen SP, the thicker the metal layer ML may be. For example, the thickness of the metal layer ML corresponding to curve B may be less than the thickness of the metal layer ML corresponding to curve C. In addition, the apparatus 10 and method for measuring a semiconductor device may quantitatively measure the thickness of the metal layer ML using Equation 1 and/or Equation 2.

While the inventive concept has been particularly shown and described with reference to embodiments thereof, it will be understood that various changes in form and details may be made therein without departing from the spirit and scope of the following claims.

What is claimed is:

1. A method comprising:
preparing a wafer including an oxide site provided on the wafer for a semiconductor device;
detecting a first intensity of first X-rays diffracted by the oxide site as a first integral area of a graph of the intensity of the X-rays diffracted by the oxide site;
depositing a first metal layer on the wafer including the oxide site;
detecting a second intensity of second X-rays diffracted by the first metal layer deposited on the oxide site as a second integral area of a graph of the intensity of the X-rays diffracted by the first metal layer; and
measuring a thickness of the first metal layer by comparing the first intensity with the second intensity, according to $$t = \frac{-\left(\ln\left(\frac{I_2}{I_1}\right)\right)}{\mu}$$

wherein $I_1$ is the first intensity, $I_2$ is the second intensity, μ is a coefficient that varies depending on a material forming the metal layer, and t is the thickness of the metal layer.

2. The method of claim 1, wherein the thickness of the first metal layer is measured using the first intensity and the second intensity and a relationship between the thickness of the first metal layer and the intensity of the X-rays.

3. A method comprising:
preparing a wafer including an oxide site provided on the wafer for a semiconductor device;
detecting a first intensity of first X-rays diffracted by the oxide site as a first maximum value of the intensity of the first X-rays diffracted by the oxide site and detected by a detection unit;
depositing a first metal layer on the wafer including the oxide site;
detecting a second intensity of second X-rays diffracted by the oxide site on which the first metal layer has been deposited as a second maximum value of the intensity of the first X-rays diffracted by the oxide site and detected by a detection unit; and
measuring a thickness of the first metal layer by comparing the first intensity with the second intensity, according to $$t = \frac{-\left(\ln\left(\frac{I_2}{I_1}\right)\right)}{\mu}$$

wherein $I_1$ is the first intensity, $I_2$ is the second intensity, μ is a coefficient that varies depending on a material forming the metal layer, and t is the thickness of the metal layer.

4. The method of claim 1, further comprising:
depositing an insulating layer on the first metal layer;
detecting a third intensity of third X-rays diffracted by the insulating layer as a third integral area of a graph of the intensity of the X-rays diffracted by the insulating layer;
depositing a second metal layer on the insulating layer;
detecting a fourth intensity of fourth X-rays diffracted by the second metal layer deposited on the oxide site as a fourth integral area of a graph of the intensity of the X-rays diffracted by the second metal layer; and
measuring a thickness of the second metal layer by comparing the third intensity with the fourth intensity,
wherein a plurality of insulating layers, including the insulating layer, and a plurality of metal layers, including the first metal layer and the second metal layer, are alternately stacked on the semiconductor device.

5. The method of claim 1, wherein the first metal layer comprises at least one of tungsten, aluminum, copper, nickel, cobalt, molybdenum, titanium, or tantalum.

6. A method comprising:
preparing a wafer including an oxide site provided on the wafer for a semiconductor device;
detecting a first intensity of first X-rays diffracted by the oxide site;
depositing a first metal layer on the wafer including the oxide site;
detecting a second intensity of second X-rays diffracted by the oxide site on which the metal layer has been deposited; and
measuring a thickness of the metal layer by comparing the first intensity with the second intensity according to $$t = \frac{-\left(\ln\left(\frac{I_2}{I_1}\right)\right)}{\mu}$$

wherein $I_1$ is the first intensity, $I_2$ is the second intensity, μ is a coefficient that varies depending on a material forming the metal layer, and t is the thickness of the metal layer, wherein
a detection unit is disposed at a position having a first angle relative to a direction of the first X-rays generated by a light source unit,
an angle formed between the first X-rays generated by the light source unit and the oxide site is a second angle, and the first angle and the second angle are unchanged between the detecting of the first intensity and the detecting of the second intensity.

7. The method of claim 6, further comprising:
rotating at least one of the light source unit, a stage supporting the semiconductor device, or the detection unit; and
determining the second angle upon the detection unit detecting a maximum value of the first intensity of the first X-rays diffracted by the semiconductor device among different positions obtained by the rotation.

8. The method of claim 6, wherein the second angle is determined in a state in which the first angle is fixed.

9. The method of claim 6, wherein the first angle varies according to the second angle.

10. The method of claim 8, wherein, when measuring the first intensity, the semiconductor device comprises a wafer, and when measuring the second intensity, the semiconductor device comprises the wafer and the metal layer.

11. The method of claim 6, wherein the semiconductor device comprises a Dynamic Random Access Memory (DRAM) or a Vertical NAND (VNAND) memory.

12. The method of claim 6, wherein the thickness of the metal layer is greater than about 10 micrometers.

13. The method of claim 3, wherein the thickness of the first metal layer is measured using the first intensity and the second intensity and a relationship between the thickness of the metal layer and the intensity of the X-rays.

14. The method of claim 3, further comprising:
depositing an insulating layer on the first metal layer;
detecting a third intensity of third X-rays diffracted by the insulating layer as a third maximum value of the intensity of the X-rays diffracted by the insulating layer;
depositing a second metal layer on the insulating layer;
detecting a fourth intensity of fourth X-rays diffracted by the second metal layer deposited on the oxide site as a fourth maximum value of the intensity of the X-rays diffracted by the second metal layer; and
measuring a thickness of the second metal layer by comparing the third intensity with the fourth intensity,
wherein a plurality of insulating layers, including the insulating layer, and a plurality of metal layers, including the first metal layer and the second metal layer, are alternately stacked on the semiconductor device.

15. The method of claim 3, wherein the first metal layer comprises at least one of tungsten, aluminum, copper, nickel, cobalt, molybdenum, titanium, or tantalum.

* * * * *